(12) United States Patent
Kim et al.

(10) Patent No.: US 10,381,606 B2
(45) Date of Patent: Aug. 13, 2019

(54) BATTERY MODULE AND BATTERY PACK COMPRISING SAME

(71) Applicant: LG CHEM, LTD., Seoul (KR)

(72) Inventors: Nam-In Kim, Daejeon (KR); Jae-Hyun Seo, Daejeon (KR); Young-Sop Eom, Daejeon (KR); Bo-Hyon Kim, Daejeon (KR); Hyun-Young Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 67 days.

(21) Appl. No.: 15/568,133

(22) PCT Filed: Sep. 8, 2016

(86) PCT No.: PCT/KR2016/010105
§ 371 (c)(1),
(2) Date: Oct. 20, 2017

(87) PCT Pub. No.: WO2017/061707
PCT Pub. Date: Apr. 13, 2017

(65) Prior Publication Data
US 2018/0166660 A1 Jun. 14, 2018

(30) Foreign Application Priority Data

Oct. 5, 2015 (KR) .................. 10-2015-0139883

(51) Int. Cl.
*H01M 2/02* (2006.01)
*H01M 2/04* (2006.01)
(Continued)

(52) U.S. Cl.
CPC .......... *H01M 2/024* (2013.01); *H01M 2/0277* (2013.01); *H01M 2/04* (2013.01);
(Continued)

(58) Field of Classification Search
CPC ...... H01M 2/024; H01M 2/04; H01M 2/0277; H01M 2/1077; H01M 10/425; H01M 2/10
See application file for complete search history.

(56) References Cited

U.S. PATENT DOCUMENTS 9,413,038 B2  8/2016  Choi et al.
2009/0220853 A1*  9/2009  Yang ................... H01M 2/0277
                                                     429/159
(Continued)

FOREIGN PATENT DOCUMENTS

JP    H8-273647 A    10/1996
JP    2011-181502 A   9/2011
(Continued)

OTHER PUBLICATIONS

International Search Report for PCT/KR2016/010105 (PCT/ISA/210) dated Sep. 8, 2016.

*Primary Examiner* — Stewart A Fraser
(74) *Attorney, Agent, or Firm* — Birch, Stewart, Kolasch & Birch, LLP

(57) ABSTRACT

Provided is a battery module. The battery module according to an embodiment of the present disclosure may include: a cartridge assembly including a plurality of cartridges configured to receive battery cells; a substrate protecting body combined to the cartridge assembly; a casing configured to receive the cartridge assembly and the substrate protecting body and surround the cartridge assembly and the substrate protecting body; and a cover capable of being combined to the casing.

9 Claims, 6 Drawing Sheets

(51) Int. Cl.
  H01M 2/10 (2006.01)
  H01M 10/052 (2010.01)
  H01M 10/42 (2006.01)
  H01M 10/625 (2014.01)

(52) U.S. Cl.
  CPC ........... H01M 2/10 (2013.01); H01M 2/1077 (2013.01); H01M 10/052 (2013.01); H01M 10/42 (2013.01); H01M 10/425 (2013.01); H01M 10/625 (2015.04)

(56) References Cited

U.S. PATENT DOCUMENTS

| | | | | |
|---|---|---|---|---|
| 2009/0305116 | A1* | 12/2009 | Yang | H01M 2/0212 429/61 |
| 2010/0021802 | A1* | 1/2010 | Yang | H01M 2/0212 429/91 |
| 2011/0070474 | A1* | 3/2011 | Lee | B60L 3/0046 429/120 |
| 2011/0206948 | A1* | 8/2011 | Asai | H01M 2/0473 429/7 |
| 2011/0217571 | A1 | 9/2011 | Kim et al. | |
| 2012/0301747 | A1 | 11/2012 | Han et al. | |
| 2014/0234670 | A1 | 8/2014 | Lee | |
| 2014/0315057 | A1 | 10/2014 | Lee et al. | |
| 2015/0303412 | A1 | 10/2015 | Lee | |
| 2016/0056425 | A1* | 2/2016 | Kim | H01M 2/1061 429/151 |
| 2018/0138475 | A1* | 5/2018 | Seo | H01M 2/1077 |

FOREIGN PATENT DOCUMENTS

| | | |
|---|---|---|
| JP | 2014-049303 A | 3/2014 |
| JP | 2014-157808 A | 8/2014 |
| JP | 2014-203741 A | 10/2014 |
| KR | 10-2013-0018494 A | 2/2013 |
| KR | 10-2014-0066512 A | 6/2014 |
| KR | 10-2015-0042463 A | 4/2015 |
| WO | 2014/185566 A1 | 11/2014 |

* cited by examiner

BATTERY MODULE AND BATTERY PACK COMPRISING SAME

TECHNICAL FIELD

The present disclosure relates to a battery module and a battery pack including the battery module, and more particularly, to a battery module in which, even when vibration or impact occurs in the battery module, a casing is limited from movement by being contacted with or hooked by a substrate protecting body, thereby preventing a separation of the casing from the substrate protecting body, and a battery pack including the battery module.

The present application claims priority to Korean Patent Application No. 10-2015-0139883 filed on Oct. 5, 2015 in the Republic of Korea, the disclosure of which is incorporated herein by reference.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

Such lithium secondary battery mainly uses a lithium oxide and a carbonaceous material as an anode active material and a cathode active material, respectively. The lithium secondary battery includes an electrode assembly in which an anode plate and a cathode plate, respectively coated with the anode active material and the cathode active material, are arranged with a separator therebetween, and an outer member, that is, a battery case, which seals and receives the electrode assembly together with an electrolyte solution.

The lithium secondary battery includes the anode, the cathode, the separator therebetween, and an electrolyte. Depending on which one of the anode active material and the cathode active material is used, the lithium secondary battery is divided into a lithium ion battery (LIB), a lithium polymer ion battery (LPIB), and etc. Typically, an electrode of the lithium secondary battery is formed by applying and drying the anode active material or the cathode active material to a current collector such as a sheet, a mesh, a film, and a foil of aluminum or copper.

Generally, a battery module of the secondary battery may include plates combined to each other by using a welding method or the like in order to protect internal components from vibration or impact. In this case, a bonding strength of welded portions of the plates may be weakened due to defects in welding or the like, or an elapse of time, and when vibration or impact occurs in the battery module, the plates may move upward or downward, thereby resulting in a total separation of combination.

DISCLOSURE

Technical Problem

The present disclosure is designed to solve the problems of the related art, and therefore, the present disclosure is directed to providing a battery module in which, even when vibration or impact occurs therein, a separation of a casing is prevented because the casing is limited from movement by being contacted with or hooked by a substrate protecting body, and a battery pack including the battery module.

In addition, the present disclosure is directed to providing a battery module in which the substrate protecting body is arranged between a bushing member and the casing, and thus, is protected by both the bushing member and the casing, and a battery pack including the battery module.

Technical Solution

In one aspect of the present disclosure, there is provided a battery module including: a cartridge assembly including a plurality of cartridges configured to receive battery cells; a substrate protecting body combined to the cartridge assembly; a casing configured to receive the cartridge assembly and the substrate protecting body and surround the cartridge assembly and the substrate protecting body; and a cover capable of being combined to the casing.

In addition, the casing may include a first bent unit bent in a predetermined direction and the substrate protecting, body may include a second bent unit bent to correspond to the first bent unit.

In addition, the first bent unit and the second bent unit may be arranged close to each other so that, when the casing moves, the first bent unit is configured to contact the second bent unit and limit a moving range of the casing.

In addition, at least one of the first bent unit and the second bent unit may include a round portion with a round formed therein.

In addition, the first bent unit and the second bent unit may be in a symmetrical form.

In addition, an insertion hole for inserting a bushing member to which a fastening member is combined may be formed in the substrate protecting body.

In addition, when the bushing member is inserted into the insertion hole, the substrate protecting member may be arranged between the bushing member and the casing.

In addition, the substrate protecting member may include plastic material.

In another aspect of the present disclosure, there are also provided a battery pack including the battery module described above and further, an automobile including the battery module.

Advantageous Effects

Embodiments of the present disclosure may prevent a casing from being separated from a battery module by limiting a movement of the casing by being contacted with or hooked to a substrate protecting body even when vibration or impact occurs in the battery module.

Further, the substrate protecting body may be arranged between a bushing member and be protected by both the casing and the bushing member, and thereby, damage or deformation due to vibration, impact or an external force in various directions may be prevented.

MODE FOR DISCLOSURE

Figure 1:
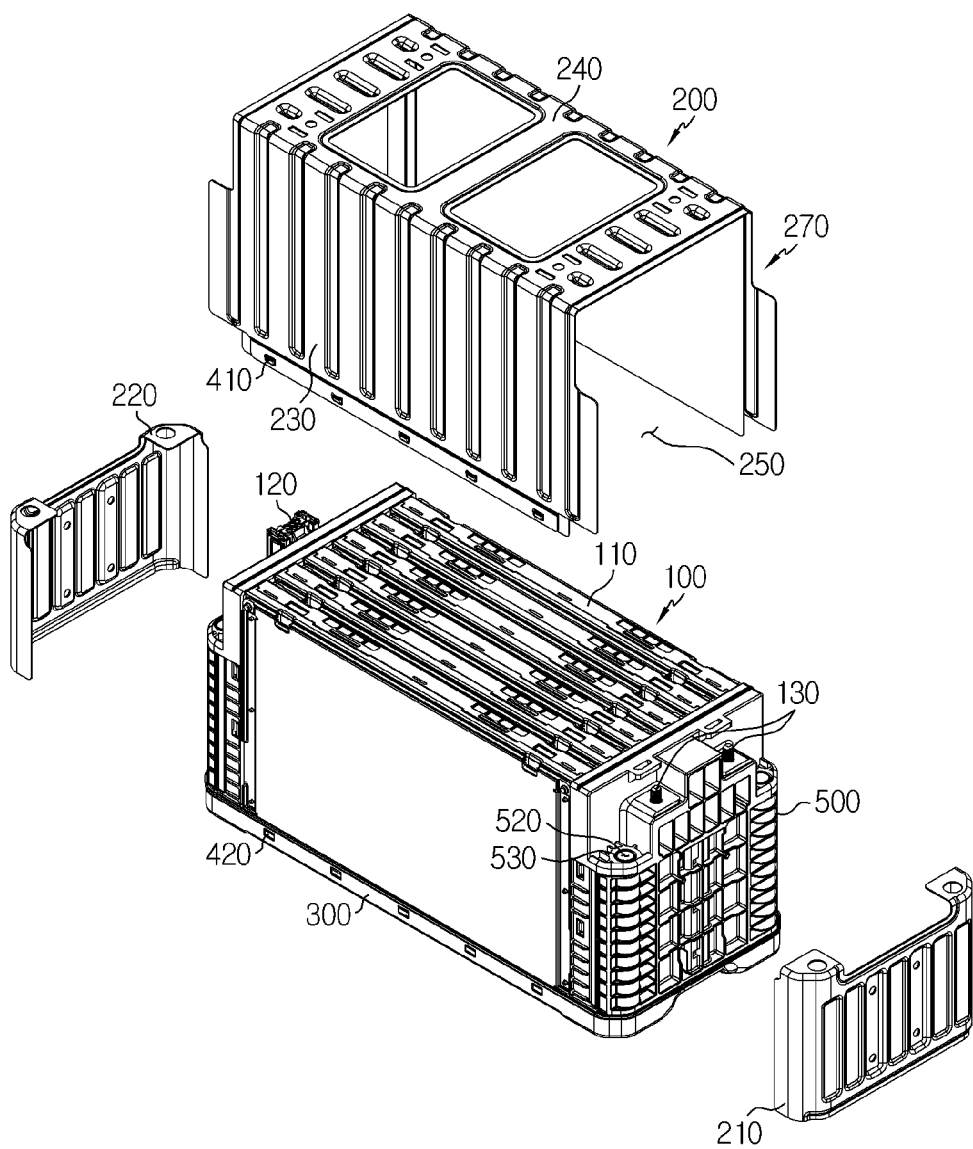
FIG. 1 is an exploded perspective view of a battery module according to an embodiment of the present disclosure.

Hereinafter, a battery module and a battery pack including the battery module according to embodiments of the present disclosure will be described in detail with reference to the accompanying drawings.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific portion constituting, the element is exaggerated, omitted, or schematically shown for convenience and clarity of description. Thus, the size of each component may not entirely reflect the actual size. In the case where it is judged that the detailed description of the related known functions or constructions may unnecessarily obscure the gist of the present disclosure, such explanation will be omitted.

The term, 'combine' or 'connect' as used herein, may refer not only to a case where one member and another member are directly combined or directly connected but also a case where one member is indirectly combined with another member via a connecting member or is indirectly connected.

Figure 2:
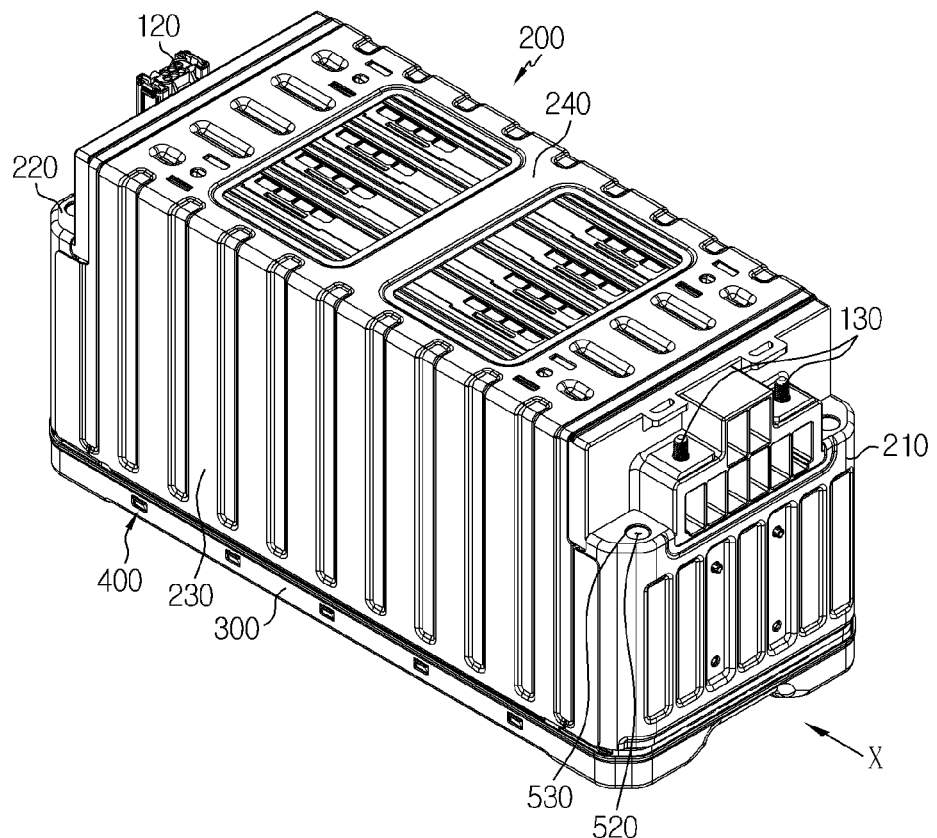
FIG. 2 is an assembled perspective view of FIG. 1.

FIG. 1 is an exploded perspective view of a battery module 10 according to an embodiment of the present disclosure, and FIG. 2 is an assembled perspective view of FIG. 1.

Referring to FIGS. 1 and 2, the battery module 10 according to an embodiment of the present disclosure may include a cartridge assembly 100, a casing 200, a cover 300, and a substrate protecting body 500.

Referring to FIG. 1, the cartridge assembly 100 may include a plurality of cartridges to receive the battery cells 110. The cartridge assembly 100 may be manufactured via an injection molding of plastic and the plurality of cartridges including receiving units to receive the battery cells 110 may be stacked. The cartridge assembly 100 may be accommodated inside a space formed by a combination of the casing 200 and the cover 300, and the battery cell 110 received in the cartridge may be accommodated inside the space and protected. The cartridge assembly 100 may include a connecting element 120 or a terminal element 130. The connecting element 120 may include, for example, various types of electrical connecting parts or connecting members for being connected to a battery management system (BMS) (not illustrated) or the like capable of providing data on voltage or temperature of the battery cell 110. In addition, the terminal element 130 may be a main terminal connected to the battery cell 110 and include an anode terminal and a cathode terminal. The terminal element 130 may be electrically connected to the outside via a terminal bolt.

Referring to FIGS. 1 and 2, the casing 200 may receive and surround the cartridge assembly 100 and a substrate protecting body 500 to be described later, thereby protecting the cartridge assembly 100 and the substrate protecting body 500 from external vibration or impact. The casing 200 may be formed in a shape corresponding to the shape in which the substrate protecting body 500 is combined to the cartridge assembly 100. For example, when the shape in which the substrate protecting body 500 is combined to the cartridge assembly 100 is in a hexahedron shape, the casing 200 may be prepared in the hexahedron shape corresponding thereto. The casing 200 may be made of, for example, a plate of metal material. In addition, the casing 200 may be manufactured as an integrated type or a separated type. In the present disclosure, for convenience of explanation, a case will be mainly described in which the casing 200 is prepared with a plurality of plates and the plurality of plates are combined to each other as a separated type. However, the embodiment is not limited thereto. When the casing 200 is manufactured of the plate of metal material, the casing 200 may include a front plate 210, a rear plate 220, a side plate 230, and a top plate 240. Here, the side plate 230 and the top plate 240 may be formed as an integrated type, and the front plate 210 and the rear plate 220 may be individually formed, and the casing 200 may be manufactured by mutually combining respective plates 210, 220, 230, and 240 to each other via welding or the like. However, a type of combining respective plates 210, 220, 230, and 240 to each other may not be limited to welding, and respective plates 210, 220, 230, and 240 may be combined to each other via various methods such as a rivet, a bolt, a pin, a bracket, and a moment bonding method.

An opening 250 for receiving the cartridge assembly 100 may be formed in the casing 200. In FIG. 1, the opening 250 may be formed on a bottom side of the casing 200 so that the casing 200 is arranged so as to receive and surround the cartridge assembly 100 from a top side of the cartridge assembly 100, but the present embodiment is limited thereto. The opening 250 may be formed on the top side of the casing 200 so that the casing 200 is arranged so as to receive and surround the cartridge assembly 100 from the bottom side of the cartridge assembly 100.

In the casing 200, a penetration unit 270 may be formed through which the connecting element 120 or the terminal element 130 described above can be exposed to the outside. In other words, the connecting element 120 or the terminal element 130 may be electrically connected to an external predetermined part or member, and the penetration unit 270 may be formed in the casing 200 so that an electrical connection is not disturbed by the casing 200. In addition, referring to FIGS. 1 and 2, the connecting element 120 or the terminal element 130 may be exposed to the outside of the casing 200 through the penetration unit 270 formed in the casing 200 and be connected to the external components. The penetration unit 270 may be formed by cutting at least one surface of the casing 200. Here, the penetration unit 270 may not necessarily need to be cut such that the connecting element 120 or the terminal element 130 is exposed to the outside, and may be formed by a small hole through which wires or the like can go as long as the connecting element 120 or the terminal element 130 is electrically connected to the external components.

On the other hand, the casing 200 may include the first bent unit 260 bent in a predetermined direction and detailed descriptions thereof will be provided later.

Referring to FIGS. 1 and 2, the cover 300 may be combined to the casing 200, particularly, to the opening unit 250 of the casing 200. In other words, the cartridge assembly 100 may be accommodated in the space formed by a combination of the casing 200 and the cover 300, and thus, may be protected from the external vibration or impact.

The cover 300 may be combined to the casing 200 via various methods such as welding, a bolt, and a pin, and may preferably be combined to the casing 200 with the hook member 400 as described below.

When the opening 250 is formed on the bottom side of the casing 200 as illustrated in FIG. 1, the cover 300 may be combined to the opening 250 of the casing 200 on the bottom side of the casing 200. In this case, the cover 300 may protect the bottom side of the cartridge assembly 100. However, a combination location of the cover 300 is not limited thereto. When the opening 250 is formed on the top side of the casing 200 (not illustrated), the cover 300 may be combined to the opening 250 of the casing 200 on the top side of the casing 200. In this case, the cover 300 may protect the top side of the cartridge assembly 100.

Referring to FIG. 1, the substrate protecting body 500 may be combined to the cartridge assembly 100 and protect various substrates inside the battery module 10. In addition, the substrate protecting body 500 may be prepared of plastic material and manufactured via an injection molding. The substrate may be a plate including various electric circuits and include a bus bar prepared to transmit electric energy. In other words, the substrate protecting body 500 may protect the substrate and the bus bar arranged on the substrate.

The substrate protecting body 500 may include the second bent unit 510 bent to correspond to the first bent unit 260 arranged on the casing 200 described above, and detailed descriptions on this matter will be provided later.

Referring to FIGS. 1 and 2, the casing 200 and the cover 300 may include a hook member 400 so as to be selectively combined to each other and uncombined from each other. The casing 200 and the cover 300 may be combined via bolting or welding. However, when the casing 200 and the cover 300 are combined via bolting, there may be a problem of wasting more than necessary space due to a need for a work space for inserting bolts. When the casing 200 and the cover 300 are combined via welding, there may be a difficult problem of separating the casing 200 and the cover 300 due to an abnormal phenomenon such as a cell swelling that can occur inside the battery module 10. However, when the casing 200 and the cover 300 are combined by using the hook member 400, a combination operation may be easy, there may be no wasted space because a working space like the case of bolting is not needed, and there may be an effect of easy separation and operation in a case when the abnormal phenomenon occurs inside the battery module 10. However, in the embodiment of the present disclosure, it is not excluded that the casing 200 and the cover 300 may be combined via bolting or welding. When necessary, the casing 200 and the cover 300 may be combined via various methods including bolting and welding.

The hook member 400 may include a hook projection 410 and a fastening, hole 420 to which the hook projection 410 is fastened. Referring to FIG. 1, one or more hook protrusions 410 may be arranged on the casing 200 and the fastening holes 420 may be arranged in the cover 300 so as to correspond to the number and position of the hook protrusions 410.

Although not illustrated in FIGS. 1 and 2, one or more hook protrusions 410 may be arranged on the cover 300 and the fastening holes 420 may be arranged in the casing 200 so as to correspond to the number and positions of the hook protrusions 410.

Figure 3:
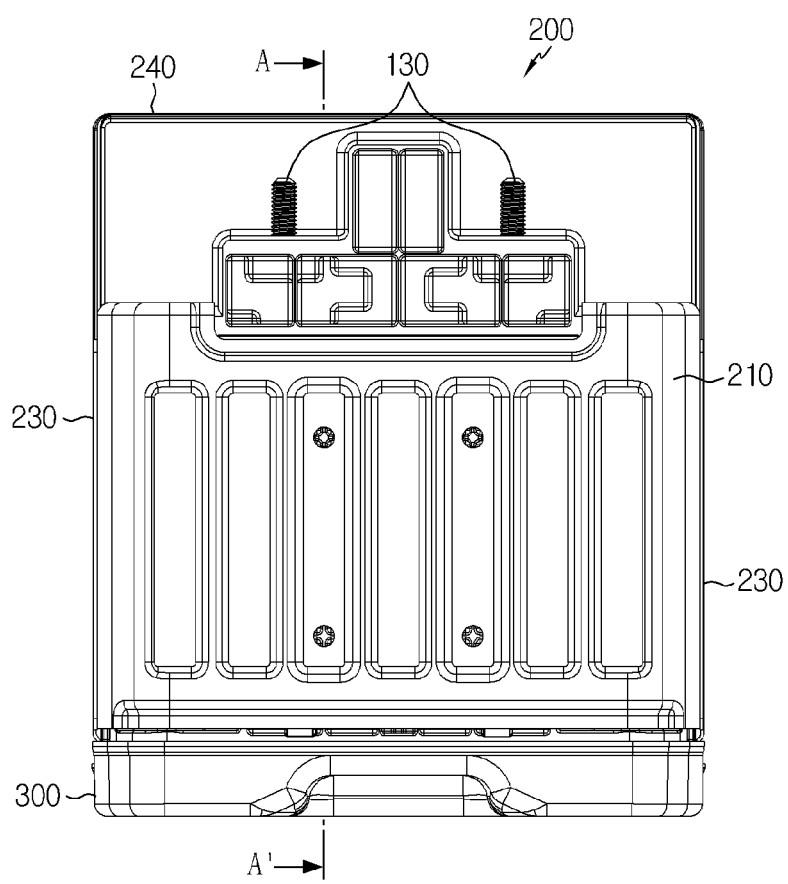
FIG. 3 is a view seen from an X direction in FIG. 2.
Figure 4:
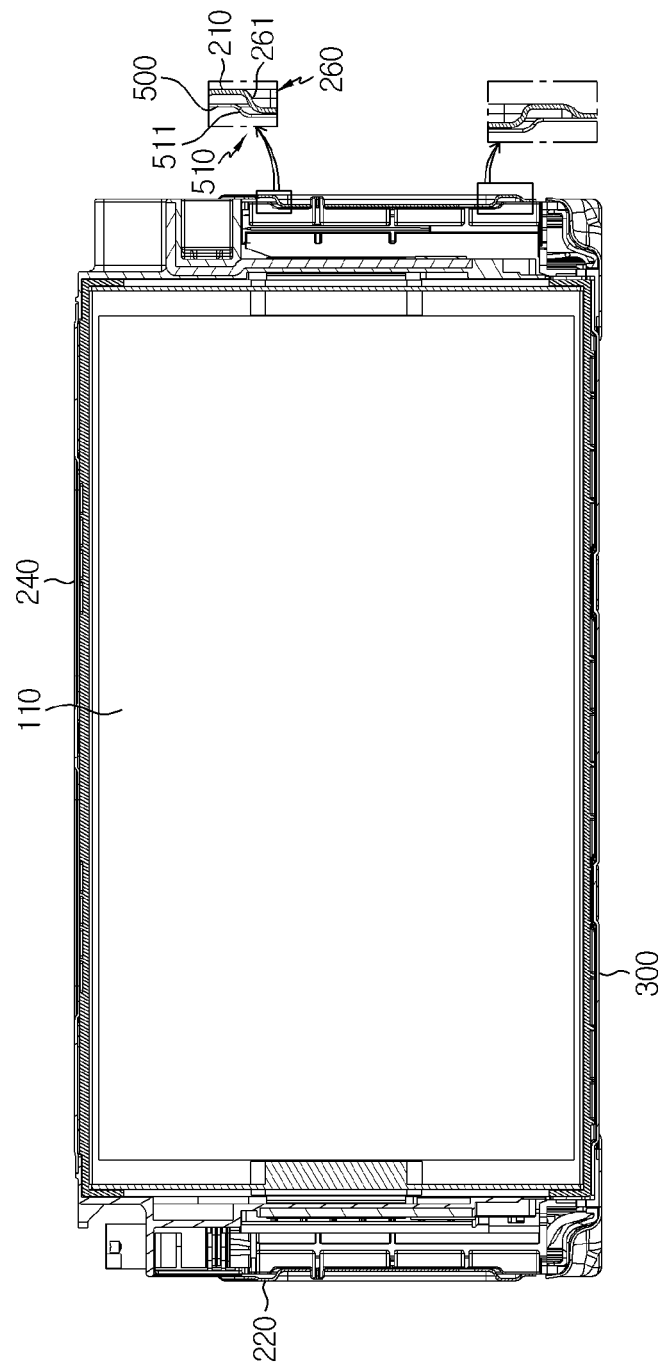
FIG. 4 is a cross-sectional view taken along the line A-A' in FIG. 3 with a partially enlarged view.

FIG. 3 is a view seen from an X direction in FIG. 2, and FIG. 4 illustrates a cross-sectional view taken along the line A-A' in FIG. 3 with a partially enlarged view.

Referring to FIGS. 3 and 4, as described above, the first bent unit 260 may be bent in the predetermined direction and be arranged on the casing 200, particularly, on the front plate 210 and the rear plate 220. In addition, the second bent unit 510 may be bent so as to correspond to the first bent unit 260 and arranged on the substrate protecting body 500. To explain this, the substrate protector 500 may be combined and fixed to the cartridge assembly 100 to protect the substrate. In addition, the casing 200 may be combined to the substrate protecting body 500, surround the substrate protecting body 500, and protect the substrate protecting body 500. However, when the casing 200 is combined to the substrate protecting body 500 via various methods, for example, welding, a bonding strength of a welded portion may be weakened due to welding defect or the like, or the elapse of time. In this case, when vibration or impact occurs in the battery module 10, the casing 200 may move upward or downward and the casing 200 may be separated from the substrate protecting body 500. However, according to the embodiment of the present disclosure, since the casing 200 includes the first bent unit 260 and the board protecting body 500 includes the second bent unit 510, the first bent unit 260 of the casing 200 may come into contact with the second bent unit 510 of the substrate protecting body 500 and the casing 200 may no longer move, even when vibration or impact occurs in the battery module 10. In other words, when vibration or impact occurs in the battery module 10 in a state where the bonding strength of the welded portion of the casing 200 is weak, the casing 200 can move upward or downward. In this case, the first bent unit 260 arranged on the casing may be brought into contact with the second bent unit 510 arranged in the substrate protecting member 500 so that the moving range of the casing 200 may be limited. Thus, the casing 200 may no longer move in an upward direction or a downward direction and the casing 200 may be prevented from being completely separated from the substrate protecting body 500, even when combination strength between the casing 200 and the substrate protecting body 500 becomes weakened. To this end, the first bent unit 260 arranged in the casing 200 and the second bent unit 510 arranged in the substrate protecting body 500 may be arranged in a mutual proximity. Here, the mutual proximity may denote a distance at which the casing 200 can be prevented from being completely separated from the substrate protector 500 by a contact of the first bent unit 260 arranged in the casing 200 with the second bent unit 510 arranged in the substrate protecting body 500, even when vibration or impact occurs in the battery module 10.

Referring to the partially enlarged view in FIG. 4, the first bent unit 260 and the second bent unit 510 may respectively include a round portion 261 and a round portion 511 including rounds therein. When the round portions 261 and 511 are respectively prepared in the first bent unit 260 and the second bent unit 510 in this manner, damage on the first bent unit 260 or the second bent unit 510 may be prevented by buffering an instantaneous impact due to a contact between the first bent unit 260 and the second bent unit 510, even when the casing 200 moves upward or downward. In addition, the first bent unit 260 and the second bent unit 510 may be arranged in a symmetrical form, thereby may limit the moving range of the casing 200 for all cases where the casing 200 moves in an upward direction or a downward direction.

Figure 5:
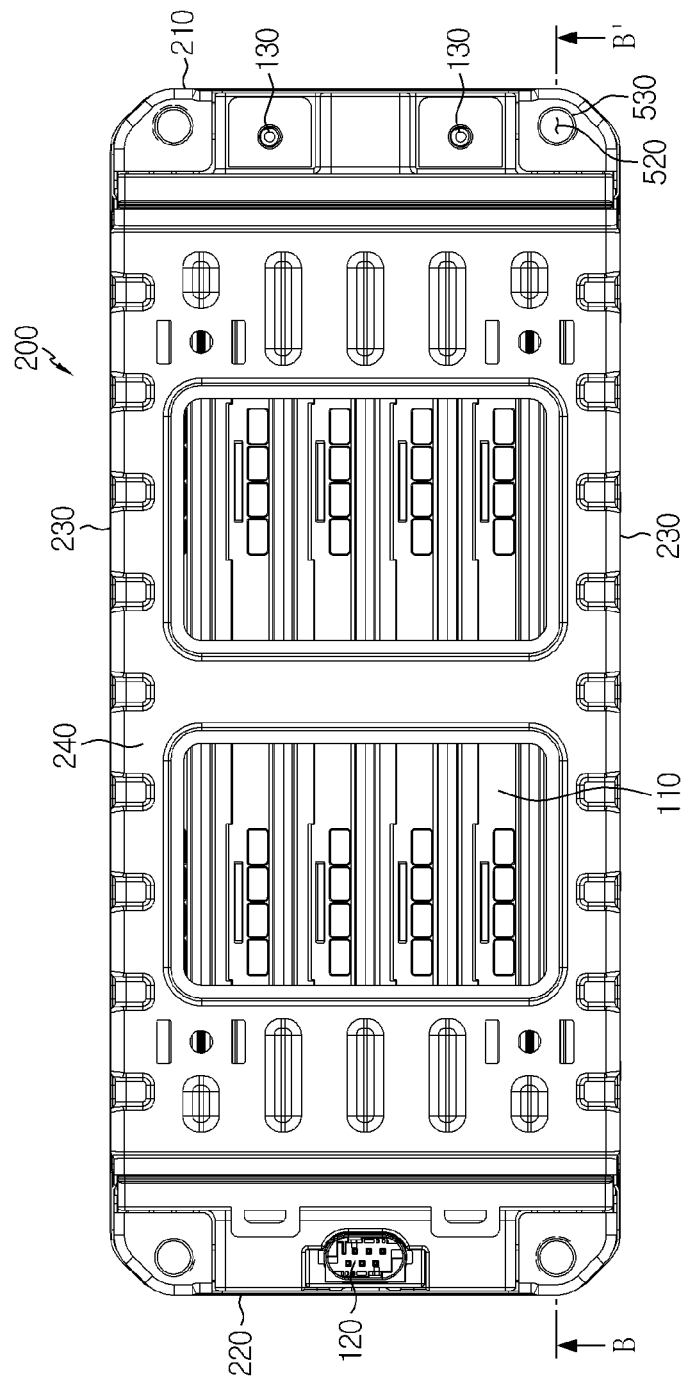
FIG. 5 is a plan view of FIG. 2.
Figure 6:
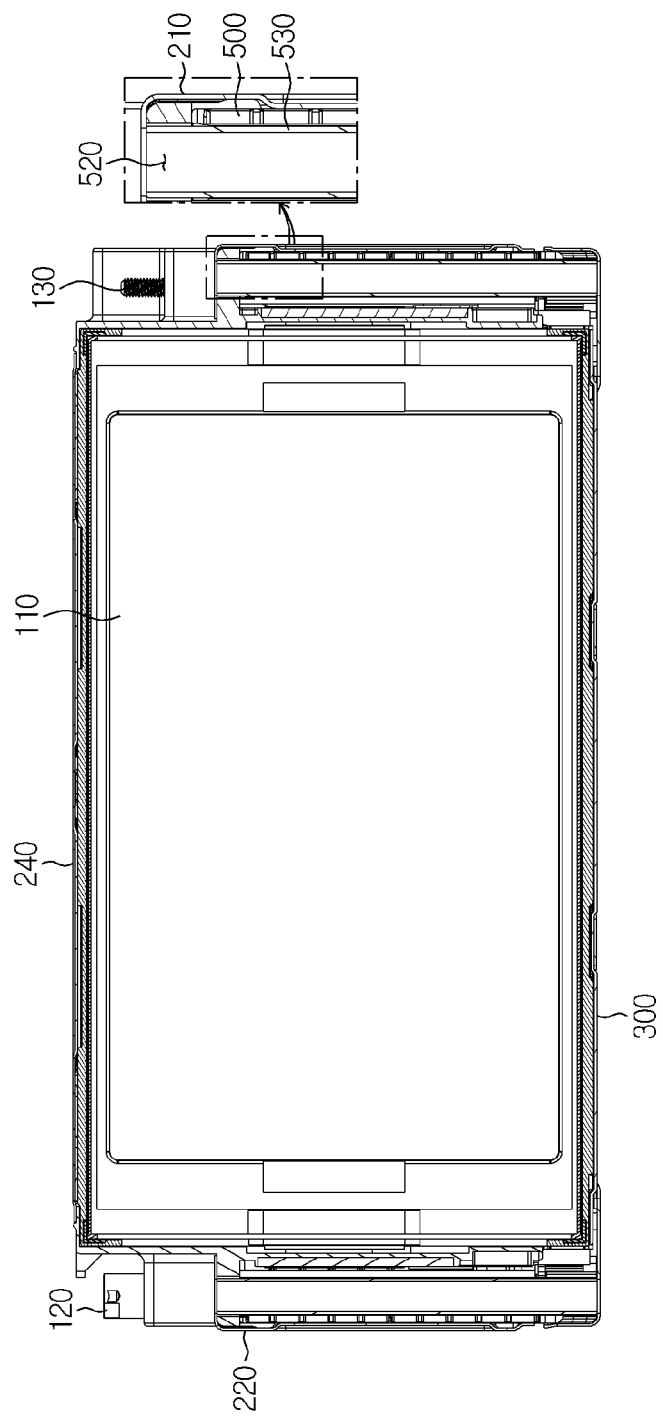
FIG. 6 is a cross-sectional view taken along the line A-A' in FIG. 5 with a partially enlarged view.

FIG. 5 is a plan view of FIG. 2, and FIG. 6 illustrates a cross-sectional view taken along the line A-A' in FIG. 5 with a partially enlarged view.

Referring to FIGS. 1, 5, and 6, an insertion hole 520 for inserting the bushing member 530 may be formed in the substrate protecting body 500. The substrate protecting body 500 may be made of plastic material. When a fastening member (not illustrated) such as a bolt is inserted to combine the substrate protecting body 500 to the cover 300, the substrate protecting body 500 made of plastic material may be damaged by the bolt. Thus, the bushing member 530 may be first inserted into the insertion hole 520 formed in the substrate protecting body 500 and the bolt may be inserted into the bushing member 530 to combine the board protecting body 500 and the cover 300. In addition, when the bushing member 530 is inserted into the insertion hole 520, the substrate protecting body 500 may be positioned between the bushing member 530 and the casing 200, particularly, the front plate 210 (refer to the partially enlarged view in FIG. 6). Thereby, the substrate protecting body 500 may be protected by both the bushing member 530 and the casing 200. In other words, the substrate protecting body 500 may be protected by the casing 200 against vibration or impact from the outside of the battery module 10, and by the bushing member 530 against vibration or impact from the inside of the battery module 10. Thus, the substrate protecting body 500 may be prevented from being damaged or deformed by vibration, impact, or an external force in various directions.

Hereinafter, an operation of the battery module 10 according to the embodiment of the present disclosure will be described.

Referring to FIG. 4, the casing 200 may include the first bent unit 260 and the substrate protecting body 500 may include the second bent unit 510. Here, the first bent unit 260 or the second bent unit 510 may include round portions 261 and 511 with rounds formed therein, and the first bent unit 260 or the second bent unit 510 may be arranged in a symmetrical form (refer to the partially enlarged view in FIG. 4). Accordingly, even when vibration or impact occurs in the battery module 10, the first bent unit 260 arranged in the casing 200 may be brought into contact with the second bent unit 510 arranged in the substrate protecting body 500, and the movement of the casing 200 may be limited. Thus, the casing 200 may no longer move in an upward direction and/or a downward direction, and the casing 200 may be prevented from being completely separated from the substrate protecting body 500.

Referring to FIGS. 1 and 6, the insertion hole 520 may be formed in the substrate protecting body 500, the bushing member 530 may be inserted into the insertion hole 520, and thus, the substrate protecting body 500 and the cover 300 may be combined by inserting a bolt or the like into the bushing member 530. Here, the substrate protecting body 500 may be prevented from being damaged when the bolt is inserted into the bushing member 530. In addition, the substrate protecting body 500 may be prevented from breakage or deformation due to various external forces of the battery module 10 while the substrate protecting body 500 is arranged between the bushing member 530 and the casing 200, particularly, the front plate 210.

A battery pack (not illustrated) according to an embodiment of the present disclosure may include one or more battery modules 10 according to an embodiment of the present disclosure as described above. In addition, the battery pack (not illustrated) may include a case for receiving the battery module 10, in addition to such battery module 10 and further include various devices such as the BMS, a current sensor, and a fuse for controlling the charging and discharging of the battery module 10.

A vehicle (not illustrated) according to an embodiment of the present disclosure may include a battery module 10 or a battery pack (not illustrated) described above, and the battery pack (not illustrated) may include the battery module 10. In addition, the battery module 10 according to an embodiment of the present disclosure may be applied to a certain vehicle (not illustrated), which is prepared to use electricity, such as the vehicle (not illustrated), for example, an electric vehicle or a hybrid vehicle.

While the present disclosure has been particularly shown and described with reference to exemplary embodiments thereof, it is to be understood that the disclosure is not to be limited to the details thereof and that various changes and modifications may be made therein by one of ordinary skill in the art without departing from the scope of the disclosure as defined by the appended claims.

INDUSTRIAL APPLICABILITY

The present disclosure relates to a battery module and a battery pack including the battery module, and more particularly, may be used for an industry related to a secondary battery.

What is claimed is:

1. A battery module comprising:
   a cartridge assembly including a plurality of cartridges configured to receive a battery cell;
   a substrate protecting body combined to the cartridge assembly;
   a casing configured to receive the cartridge assembly and the substrate protecting body and surround the cartridge assembly and the substrate protecting body; and
   a cover capable of being combined to the casing,
   wherein the casing, comprises a first bent unit bent in a predetermined direction and the substrate protecting body comprises a second bent unit bent to correspond to the first bent unit.

2. The battery module of claim 1, wherein the first bent unit and the second bent unit are arranged close to each other so that, when the casing moves, the first bent unit is configured to contact the second bent unit and limit a movement range of the casing.

3. The battery module of claim 1, wherein at least one of the first bent unit and the second bent unit comprises a round portion.

4. The battery module of claim 1, wherein the first bent unit and the second bent unit are in a symmetrical form.

5. The battery module of claim 1, wherein an insertion hole for inserting a bushing member to which a fastening member is combined is formed in the substrate protecting body.

6. The battery module of claim 5, wherein, when the bushing member is inserted into the insertion hole, the substrate protecting body is arranged between the bushing member and the casing.

7. The battery module of claim 1, wherein the substrate protecting body includes a plastic material.

8. A battery pack comprising the battery module according to claim 1.

9. An automobile comprising the battery module according to claim 1.

* * * * *